United States Patent
Rolando et al.

(10) Patent No.: US 12,348,414 B2
(45) Date of Patent: Jul. 1, 2025

(54) DEPLOYING NETWORK SECURITY SERVICES IN A VIRTUALIZED COMPUTING SYSTEM

(71) Applicant: VMware, Inc., Palo Alto, CA (US)

(72) Inventors: Pierluigi Rolando, San Marcos, CA (US); Subramanyam Manuguri, Saratoga, CA (US); Raju Koganty, San Jose, CA (US); Yuxiao Zhang, San Jose, CA (US); Akhila Naveen, Campbell, CA (US); Mani Prasad Kancherla, Cupertino, CA (US); Srinivas Ramaswamy, Dublin, CA (US); Jayakrishnan Chathu, San Jose, CA (US); Krishna Chaitanya Bandi, Pflugerville, TX (US); Hui Zheng, Great Neck, NY (US)

(73) Assignee: VMware LLC, Palo Alto, CA (US)

( * ) Notice: Subject to any disclaimer, the term of this patent is extended or adjusted under 35 U.S.C. 154(b) by 61 days.

(21) Appl. No.: 18/158,741

(22) Filed: Jan. 24, 2023

(65) Prior Publication Data

US 2024/0250905 A1 Jul. 25, 2024

(51) Int. Cl.
*H04L 45/586* (2022.01)
*H04L 45/00* (2022.01)
*H04L 45/42* (2022.01)

(52) U.S. Cl.
CPC ............ *H04L 45/586* (2013.01); *H04L 45/42* (2013.01); *H04L 45/566* (2013.01)

(58) Field of Classification Search
CPC ...... H04L 45/586; H04L 45/566; H04L 45/42
See application file for complete search history.

(56) References Cited

U.S. PATENT DOCUMENTS

| | | | |
|---|---|---|---|
| 2015/0281180 A1* | 10/2015 | Raman | G06F 9/45558 726/15 |
| 2018/0123954 A1* | 5/2018 | Jiang | H04L 49/70 |
| 2022/0188140 A1 | 6/2022 | Jain et al. | |
| 2023/0229483 A1* | 7/2023 | Sinha | G06F 9/45558 718/1 |

OTHER PUBLICATIONS

Extended European Search Report mailed Jun. 4, 2024 in European Patent Application No. 24153473.4, 11 pages.
Communication pursuant to Article 94(3) EPC mailed Apr. 17, 2025 in European Patent Application No. 24153473.4, 13 pages.

* cited by examiner

*Primary Examiner* — Suraj M Joshi
(74) *Attorney, Agent, or Firm* — Kim & Stewart LLP

(57) ABSTRACT

An example method of packet processing in a host cluster of a virtualized computing system includes: receiving traffic at packet processing software of a hypervisor executing on a host of the host cluster; processing the traffic using a network service of the packet processing software in the hypervisor; redirecting the traffic to a service virtual machine (VM) in the host cluster through a virtual network interface card (vNIC) of the service VM; sending metadata from the network service of the packet processing software to the service VM; processing the traffic and the metadata through at least one network service executing in the service VM; returning the traffic from the service VM to the packet processing software of the hypervisor; and forwarding, by the packet processing software, the traffic to a destination.

20 Claims, 6 Drawing Sheets

DEPLOYING NETWORK SECURITY SERVICES IN A VIRTUALIZED COMPUTING SYSTEM

BACKGROUND

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. Hosts can be organized into clusters ("host clusters") and managed by a virtualization management server. A physical network connecting the hosts can also be virtualized to provide a software-defined network (SDN).

An SDN can provide advanced security services such as a firewall, an intrusion detection and prevention system (IDPS), transport layer security (TLS) inspection, and the like. There are two options to execute the security services and perform packet processing in the hypervisor. In one option, the security services run as kernel modules in the hypervisor. This is typically efficient, but the hypervisor kernel is only suitable for specific services that can run synchronously with traffic (i.e., allow a packet to be processed to completion within a constrained amount of time) and are not overly complicated (running software with a large footprint directly in the hypervisor kernel presents efficiency and security implications).

A second option is to run the security services as user processes in the hypervisor (i.e., user-mode processes rather than kernel-mode). This allows for larger security services to execute in the hypervisor, which are isolated from the hypervisor kernel. The user processes can run asynchronously to the main data path in the kernel and can spend more time performing advanced operations as needed. However, overall operation is less efficient since the channels available to pass data between the hypervisor kernel and user processes are slow and inherently inefficient. Typically, the hypervisor is not designed to handle packet processing in user processes and only limited options exist to dedicate resources, control CPU allocation, etc. A more flexible and efficient solution for implementing network services such as advanced security services is required.

SUMMARY

In embodiments, a method of packet processing in a host cluster of a virtualized computing system includes: receiving traffic at packet processing software of a hypervisor executing on a host of the host cluster; processing the traffic using a network service of the packet processing software in the hypervisor; redirecting the traffic to a service virtual machine (VM) in the host cluster through a virtual network interface card (vNIC) of the service VM; sending metadata from the network service of the packet processing software to the service VM; processing the traffic and the metadata through at least one network service executing in the service VM; returning the traffic from the service VM to the packet processing software of the hypervisor; and forwarding, by the packet processing software, the traffic to a destination.

In addition, a non-transitory computer-readable storage medium comprising instructions that cause a computer system to carry out the above method, as well as a computer system configured to carry out the above method are described.

DETAILED DESCRIPTION

Deploying network security services in a virtualized computing system is described. As noted above, network security services can execute as kernel modules in the hypervisor or as user processes in the hypervisor. This can result in poor performance as described. Techniques described herein execute network security services into special-purpose virtual machines (VMs) that are connected to the hypervisor data plane through high-performance channels. These channels are based on virtual network interfaces, such as vmxnet3 paravirtual devices, which are well understood, well characterized, and industry standard solutions for passing large amounts of data quickly between logical entities.

In embodiments, metadata is passed between the hypervisor kernel and network security services in the VM. The VM and the services executing therein are a direct extension of and tightly coupled with code executing in the hypervisor kernel. For example, a functional module of the hypervisor kernel can have an extension running as a service in the VM. Metadat can include per-packet attributes or general messages that are not network traffic (e.g., actions to be performed on network traffic). These and further aspects are discussed below with respect to the drawings.

Figure 1:
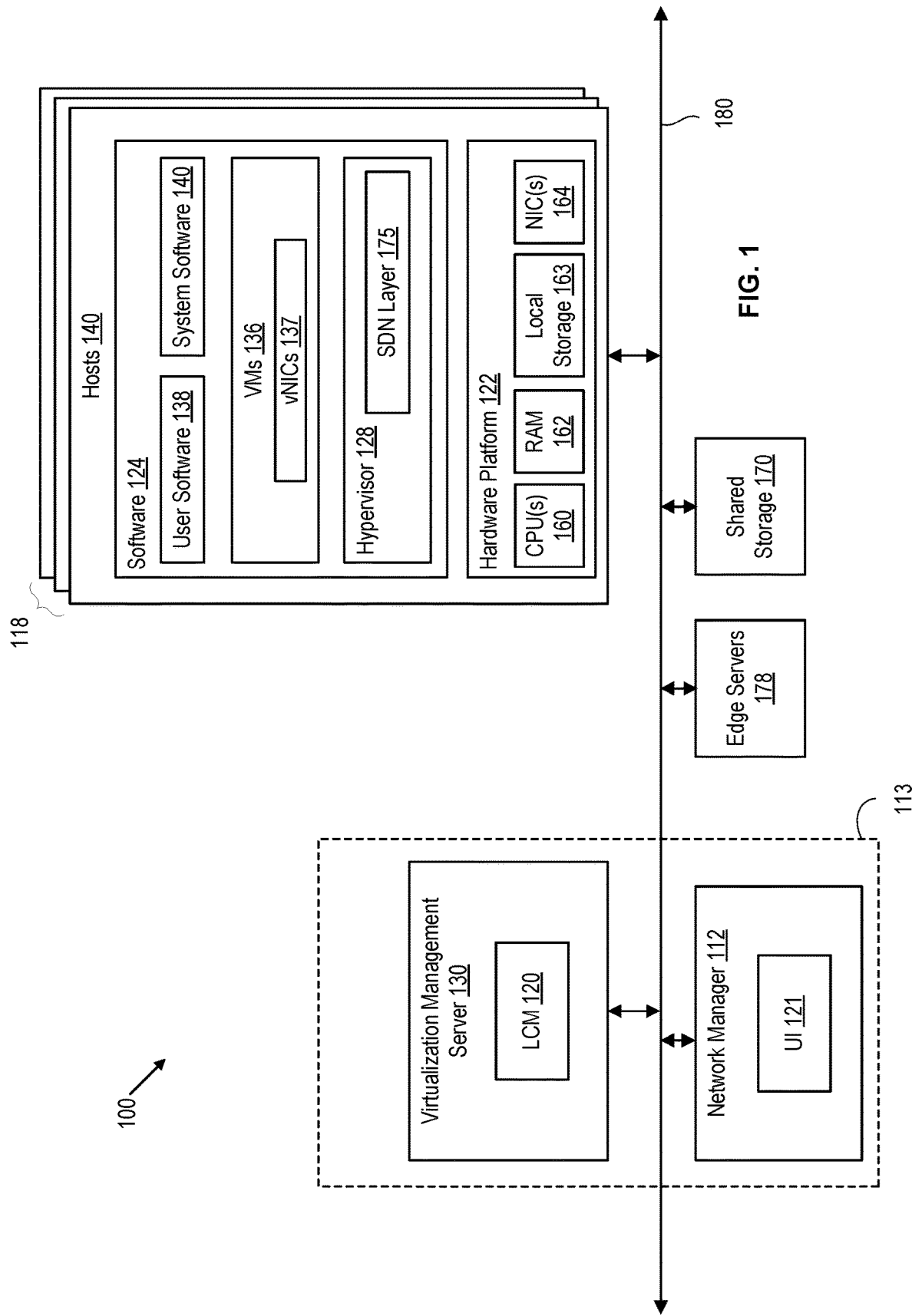
FIG. 1 is a block diagram of a virtualized computing system according to embodiments.

FIG. 1 is a block diagram of a virtualized computing system 100 according to embodiments. Virtualized computing system 100 includes a cluster of hosts 140 ("host cluster 118") that may be constructed on hardware platforms such as an x86 architecture platforms, ARM architecture platforms, or the like. For purposes of clarity, only one host cluster 118 is shown. However, virtualized computing system 100 can include many of such host clusters 118. As shown, a hardware platform 122 of each host 140 includes conventional components of a computing device, such as one or more central processing units (CPUs) 160, system memory (RAM) 162, one or more network interface controllers (NICs) 164, and optionally local storage 163. CPUs 160 are configured to execute instructions, for example, executable instructions that perform one or more operations described herein, which may be stored in RAM 162. NICs 164 (also referred to as physical NICs or pNICs) enable host 140 to communicate with other devices through a physical network 180. One or more of NICs 164 can be "smart NICs" and have separate processing systems (e.g., separate CPU and memory from the host). Physical network 180 enables communication between hosts 140 and between other components and hosts 140 (other components discussed further herein).

In FIG. 1, hosts 140 may access shared storage 170 by using NICs 164 to connect to network 180. In another embodiment, each host 140 contains a host bus adapter (HBA) through which input/output operations (IOs) are sent to shared storage 170 over a separate network. Shared storage 170 include one or more storage arrays, such as a storage area network (SAN), network attached storage (NAS), or the like. Hosts 140 may include local storage 163 (e.g., hard disk drives, solid-state drives, etc.). Local storage 163 in each host 140 can be aggregated and provisioned as part of a virtual SAN, which is another form of shared storage 170.

Software 124 of each host 140 provides a virtualization layer, referred to herein as a hypervisor 128, which abstracts processor, memory, storage, and network resources of hardware platform 122 to provide a virtual machine execution space within which multiple virtual machines (VMs) 136 may be concurrently instantiated and executed. VMs 136 provide isolated execution spaces on a single physical host within which separate operating systems and application software can execute. In an embodiment, there is no intervening software, such as a host operating system (OS), between hypervisor 128 and hardware platform 122. Thus, hypervisor 128 can be a Type-1 hypervisor (also known as a "bare-metal" hypervisor). As a result, the virtualization layer in host cluster 118 (collectively hypervisors 128) can be a bare-metal virtualization layer executing directly on host hardware platforms. VMs 136 can execute software deployed by users (e.g., user software 142), as well as system software 144 deployed by management/control planes to provide support. System software 144 can execute in VMs 136 transparent to the user (e.g., the user interacts with the management/control planes and the management/control planes deploy VMs 136 with system software 144 transparently to the user).

Figure 2:
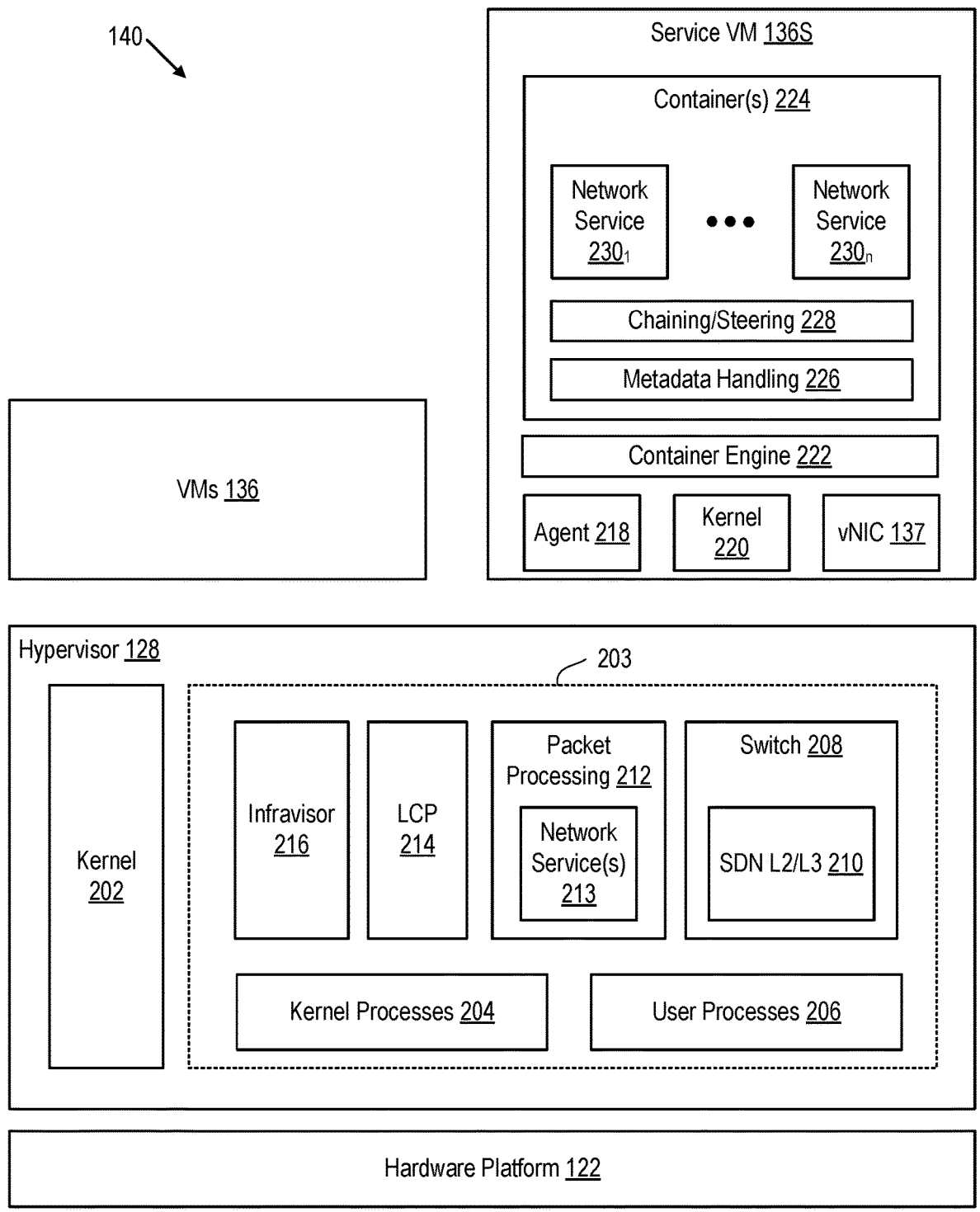
FIG. 2 is a block diagram depicting a host according to embodiments.

Some VMs 136 comprise "native VMs," which are VMs that execute a guest operating system (OS) and applications thereon. Native VMs can include a full set of virtual hardware, including support for peripherals, displays, and the like, and the guest OS provides support for this set of virtual hardware. Other VMs 136 comprise "service VMs," which are VMs that execute a lightweight OS configured to support a container runtime environment and executing software in containers. A service VM includes only a portion of the full set of virtual hardware presented to a native VM. For example, a service VM can omit support for peripherals and displays and can include direct boot support. A native VM typically boots a guest OS from a virtual disk, which requires virtual firmware (e.g., a basic input/output system (BIOS)). A service VM can omit virtual firmware and execute a pre-loaded OS directly. An embodiment of a service VM is shown in FIG. 2 and described below (service VM 136S).

Host cluster 118 is configured with a software-defined network (SDN) layer 175 at least partially implemented by hypervisors 128. SDN layer 175 includes logical network services executing on virtualized infrastructure in host cluster 118. The virtualized infrastructure that supports the logical network services includes hypervisor-based components, such as resource pools, virtual switches, etc., as well as VM-based components, such as router control VMs, load balancer VMs, edge servers, etc. Logical network services include logical switches and logical routers, as well as logical firewalls, logical load balancers, and the like, implemented on top of the virtualized infrastructure. Virtualized computing system 100 may include edge servers 178 that provide an interface of host cluster 118 to a wide area network (WAN) (e.g., a corporate network, the public Internet, etc.). Edge servers 178 can be physical servers or VMs. VMs 136 include virtual NICs (vNICs) 137 connected to logical switch ports in SDN layer 175. A vNIC 137 is a virtual device presented to a VM 136 by the hypervisor 128 that emulates a pNIC. Hypervisor 128 includes tunnel endpoints (TEPs) for encapsulating/decapsulating traffic traversing between hosts 140 on SDN layer 175 using a Layer 2-over-Layer 3 tunneling protocol, such as GENEVE, VXLAN, or the like. The encapsulated traffic traverses an overlay network supported by physical network 181 (the underlay network).

Virtualization management server 130 is a physical or virtual server that manages host cluster 118 and the virtualization layer therein. Virtualization management server 130 installs agent(s) in hypervisor 128 to add a host 140 as a managed entity. Virtualization management server 130 logically groups hosts 140 into host cluster 118 to provide cluster-level functions to hosts 140. The number of hosts 140 in host cluster 118 may be one or many. Virtualization management server 130 can manage more than one host cluster 118. Virtualization management server 130 can include a lifecycle manager (LCM) 120. A user interacts with LCM 120 to define a desired state of host cluster 118. LCM 120 cooperates with hypervisors 128 in hosts 140 to bring the state of host cluster 118 to the desired state. In embodiments, the desired state can include deployment of one or more service VMs that will execute network services, as described further below.

In an embodiment, virtualized computing system 100 further includes a network manager 112. Network manager 112 is a physical or virtual server that orchestrates SDN layer 175. In an embodiment, network manager 112 comprises one or more virtual servers deployed as VMs. Network manager 112 installs additional agents in hypervisor 128 to add a host 140 as a managed entity, referred to as a transport node. In this manner, host cluster 118 can be a cluster of transport nodes. In embodiments, network manager 112 includes a user interface (UI) 121 through which a user can interact with network manager 112. Through UI 121, a user can define configurations and policies for SDN layer 175, including network services thereof. Network manager 112 and virtualization management server 130 can execute in a management cluster 113.

FIG. 2 is a block diagram depicting a host 140 according to embodiments. Hypervisor 128 includes a kernel 202 and hypervisor software 203. Kernel 202 provides operating system functionality (e.g., process creation and control, file system, process threads, etc.), as well as CPU scheduling and memory scheduling across guest software in VMs 138 and across hypervisor software 203. Hypervisor software 203 includes kernel processes 204 and user processes 206. Kernel processes 204 execute at a higher privilege level (e.g., kernel-mode) than user processes 206 (e.g., user-mode). Hypervisor software 203 includes infravisor 216, local control plane (LCP) 214, packet processing 212, and switch 208, each of which can execute as one or more kernel processes 204, one or more user processes 206, or both user and kernel processes. Packet processing 212 can include network service(s) 213. Switch 208 can include SDN layer 2 and layer 3 processing (SDN L2/L3 210).

Hypervisor 128 supports execution of VMs 136, including a service VM 136S. Service VM 136S includes a kernel 220, an agent 218, a vNIC 137, a container engine 222, and one or more containers 224. Metadata handling 226, chaining/steering 228, and network services $230_1 \ldots 230n$ (where n is an integer greater than zero) comprise software executing within container(s) 224. Container engine 222 and agent 218 comprise software managed by kernel 220. Container(s) 224 run in an execution space managed by container engine 222. Container engine 222 can be an industry-standard container engine, such as libcontainer, runc, or containerd. In various embodiments described herein, service VM is described as executing its services in containers. In another embodiment, service VM can execute its services on a guest OS without using containers. For purposes of clarity by example, containerized services are described herein. Actions performed on containerized services as described herein can also be employed on services running on a guest OS in embodiments where service VM includes services executing on a guest OS.

Infravisor 216 provides a cluster services runtime. Infravisor 216 is responsible for ensuring that services specified in the desired state as set by LCM 120 are deployed and executing within host cluster 118. Infravisor 216 is configured to deploy service VMs, boot service VMs, supply configuration data to service VMs, and to monitor health of service VMs. In the embodiment, infravisor 216 is configured to deploy and manage service VM 136S based on a desired state learned from LCM 120. The lifecycle of each container 224 is managed by infravisor 216 through agent 218. Agent 218 monitors container health and in case of any problem reports back to infravisor 216 to take appropriate actions and remediate service VM 136S (e.g., restarting service VM 136S). Infravisor 216 is also configured to obtain software installation bundles (SIBs) that includes images for the service VMs, include an image for service VM 136S.

LCP 214 provides a control interface for hypervisor 128 through which external management/control planes can manage and control hypervisor 128. For example, virtualization management server 130 and network manager 112 can provide configuration data to hypervisor 128 through LCP 214 for configuring hypervisor software 203 and service VM 136S. In embodiments, a user can interact with UI 121 to define configurations for network services, which are learned by LCP 214 and applied to network service(s) 213 and network services 230 in service VM 136S.

Packet processing 212 receives egress traffic from VMs, processes packets using network service(s) 213 (e.g., firewall service), steers traffic to service VM 136S for further packet processing by network services 230, receives return traffic from service VM 136S, and forwards the egress traffic to switch 208. Switch 208 can perform layer 2 switching and/or layer 3 routing (using SDN L2/L3 210) before sending egress traffic to physical network 180 via NIC 164. Packet processing receives ingress traffic for a destination VM, processes packets using network service(s) 213, steers traffic to service VM 136S for further packet processing by network services 230, receives return traffic from service VM 136S, and forwards the ingress traffic to the destination VM 136.

Service VM 136S executes metadata handling 226 to read metadata from traffic and optionally modify metadata for processing by network services 230. Metadata can include, for example, source and destination information, ports, parameters, and the like. Services can also add their own service-specific metadata. Chaining/steering 228 is configured to steer the traffic to specific network service(s) 230, and/or chain the traffic through a specific sequence of network services 230, depending on the metadata. Network services 230 process packets of the traffic to perform various functions, such as firewall, IDPS, TLS inspection, and the like on behalf of network service(s) 213. That is, in embodiments, network service(s) 213 offload some packet processing to be performed by network services 230 executing in service VM 136S. Metadata handling 226 can restore metadata (if modified) prior to returning traffic to packet processing 212. Communication between packet processing 212 and service VM 136S is performed through vNIC 137. In embodiments, packet processing 212 encapsulates egress traffic from VMs, or receives encapsulated ingress traffic for VMs. The traffic is encapsulated using an L2-over-L3 protocol (e.g., GENEVE). To steer traffic to service VM 136S, packet processing 212 can modify the outer packet headers to set the destination to vNIC 137 in service VM 136S.

Figure 3:
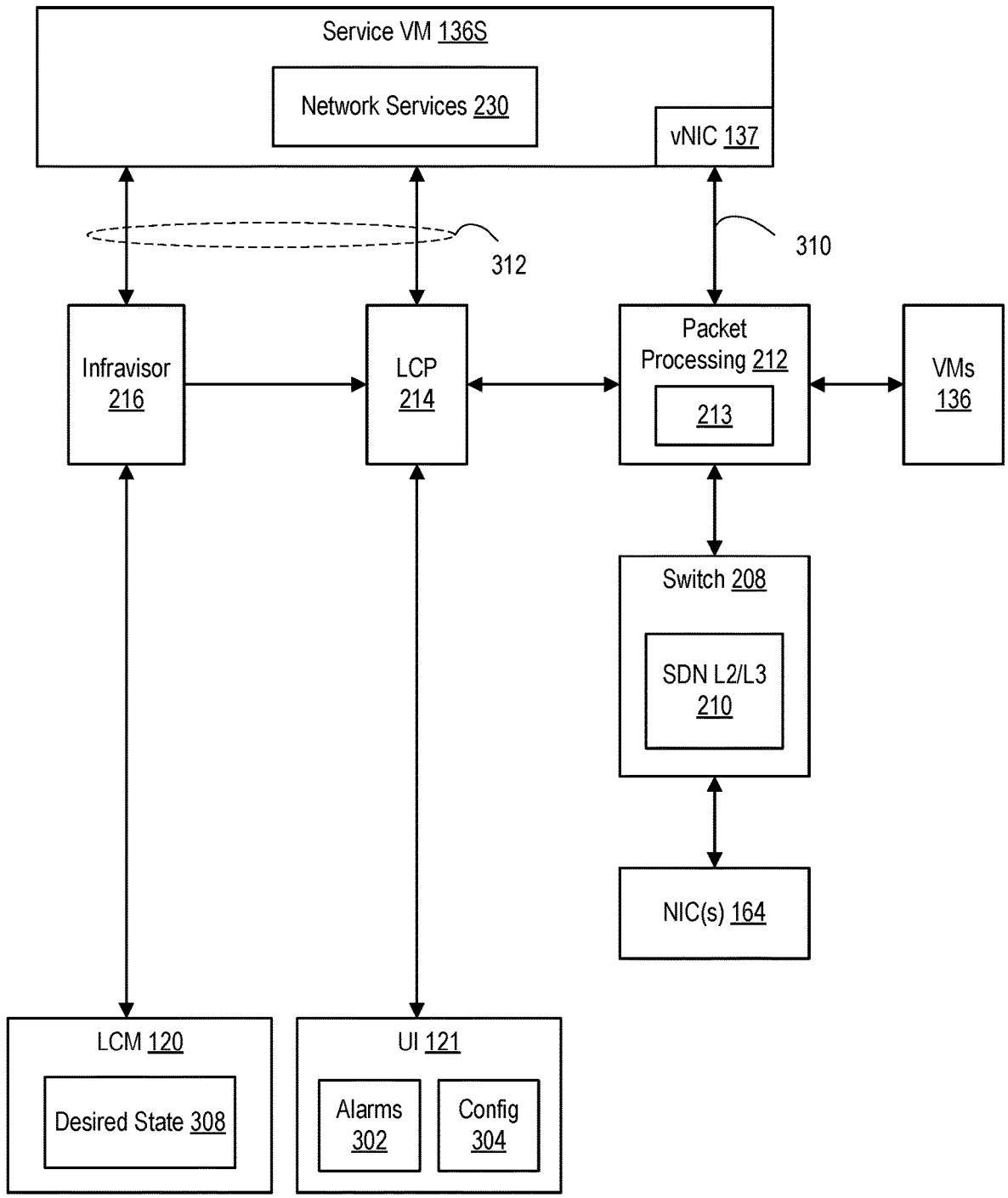
FIG. 3 is a block diagram depicting communication flow between hypervisor software and service according to embodiments.

FIG. 3 is a block diagram depicting communication flow between hypervisor software 203 and service VM 136S according to embodiments. As described above, packet processing 312 and service VM 136S exchange traffic over a channel 310 connected to vNIC 137. For example, vNIC 137 can be a VMXNET3 virtual network adaptor. Channel 310 emulates a network connection, such as an Ethernet connection. Packet processing 212 receives egress traffic from VMs 136 (e.g., from vNICs 137 of VMs 136). Packet processing 212 processes the egress traffic with network service(s) 213, offloads the egress traffic to service VM 136S over channel 310 for further processing by network services 230, receives return traffic from service VM 136S over channel 310, and provides the egress traffic to switch 208 for L2/L3 processing. Switch 208 forwards the egress traffic on physical network 180 via NIC 164. Packet processing 212 receives ingress traffic from switch 208 after L2/L3 processing, performs packet processing using network service(s) 213, offloads ingress traffic to service VM 136S over channel 310 for further packet processing, receives return traffic from service VM 136S over channel 310, and forwards the ingress traffic to a destination VM 136.

Infravisor 216 learns desired state 308 from LCM 120. Desired state 308 can specify deployment data for service VM 136S (e.g., number of CPUs, size of memory, number of vNICs, etc.). Infravisor 216 deploys service VM 136S based on desired state 308. During execution, infravisor 216 monitors service VM 136S over a channel 312. Channel 312 is a software-based communication channel out-of-band from channel 310. For example, channel 312 can be a virtual socket (VSOCK). LCP 214 can learn configuration data 304 for network services 230 from UI 212 of network manager 112. LCP 214 can push configuration data 304 to network services 230 over channel 312. LCP 214 can also perform monitoring over channel 312 and provide information to UI 121 (e.g., for generation of alarms 302 or the like). Infravisor 216 can also communicate status and the like to LCP 214 using any software communication mechanism within hypervisor 128. In embodiments, LCP 214 can also communicate with packet processing 212 within hypervisor 128 for configuring network service(s) 213 based on configuration data 304 and for receiving monitoring data from network service(s) 213 and/or network services 230. For example, service VM 136S can embed some status data in return traffic over channel 310, which can be parsed out by packet processing 212 and forwarded to LCP 214.

Figure 4:
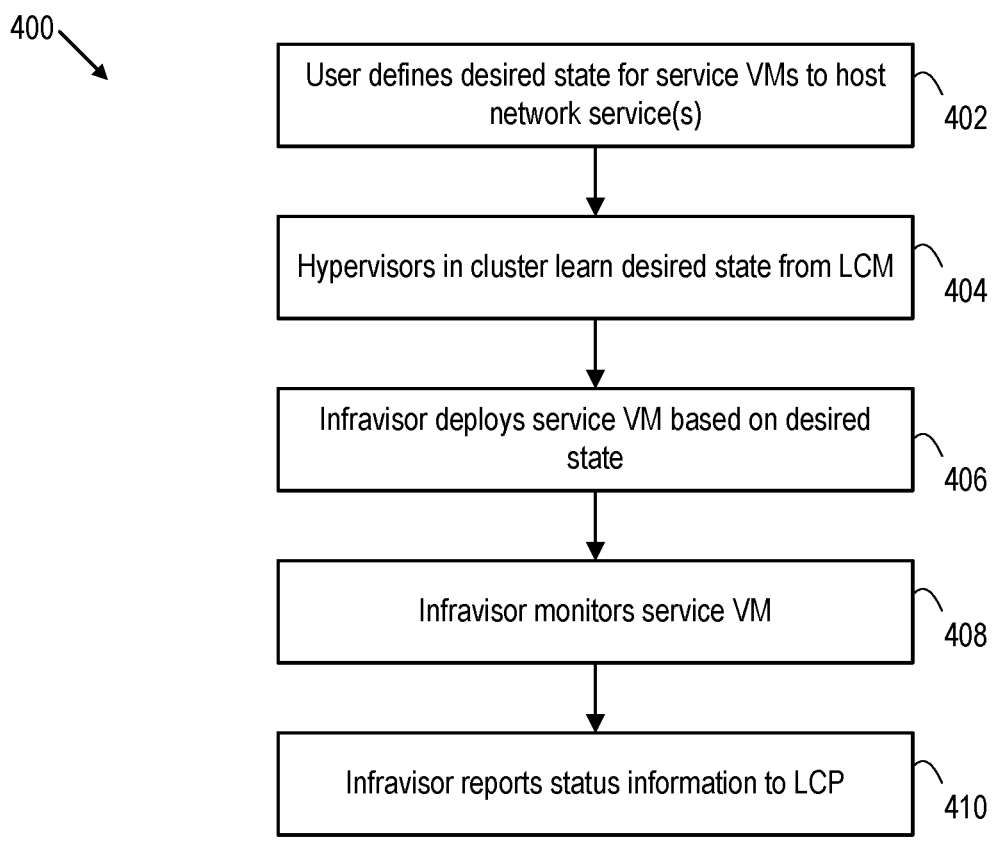
FIG. 4 is a flow diagram depicting a method of deploying a service VM for executing network services in a host cluster according to embodiments.

FIG. 4 is a flow diagram depicting a method of deploying a service VM for executing network services in a host cluster according to embodiments. Method 400 begins at step 402, where a user defines a desired state for the service VMs to host the network services. The desired state can include the number of service VMs for the host cluster, the size of the service VMs (e.g., CPUs, memory, NICs), and the like. At step 404, hypervisors in the host cluster learn the desired state from LCM 120. For example, LCM 120 can push the desired state to infravisors 216 or infravisors 216 can pull the desired state from LCM 120. At step 406, infravisor 216 deploys the service VM based on the desired state (e.g., in each hypervisor of host cluster or selected hypervisors of host cluster). At step 408, infravisor 216 monitors the service VM in each hypervisor. Infravisor 216 can restart containers or restart service VM as needed to ensure service VM maintains a healthy state. At step 410, infravisor 216 reports status information to LCP 214. The status information can include, for example, a health indictor for service VM.

Figure 5:
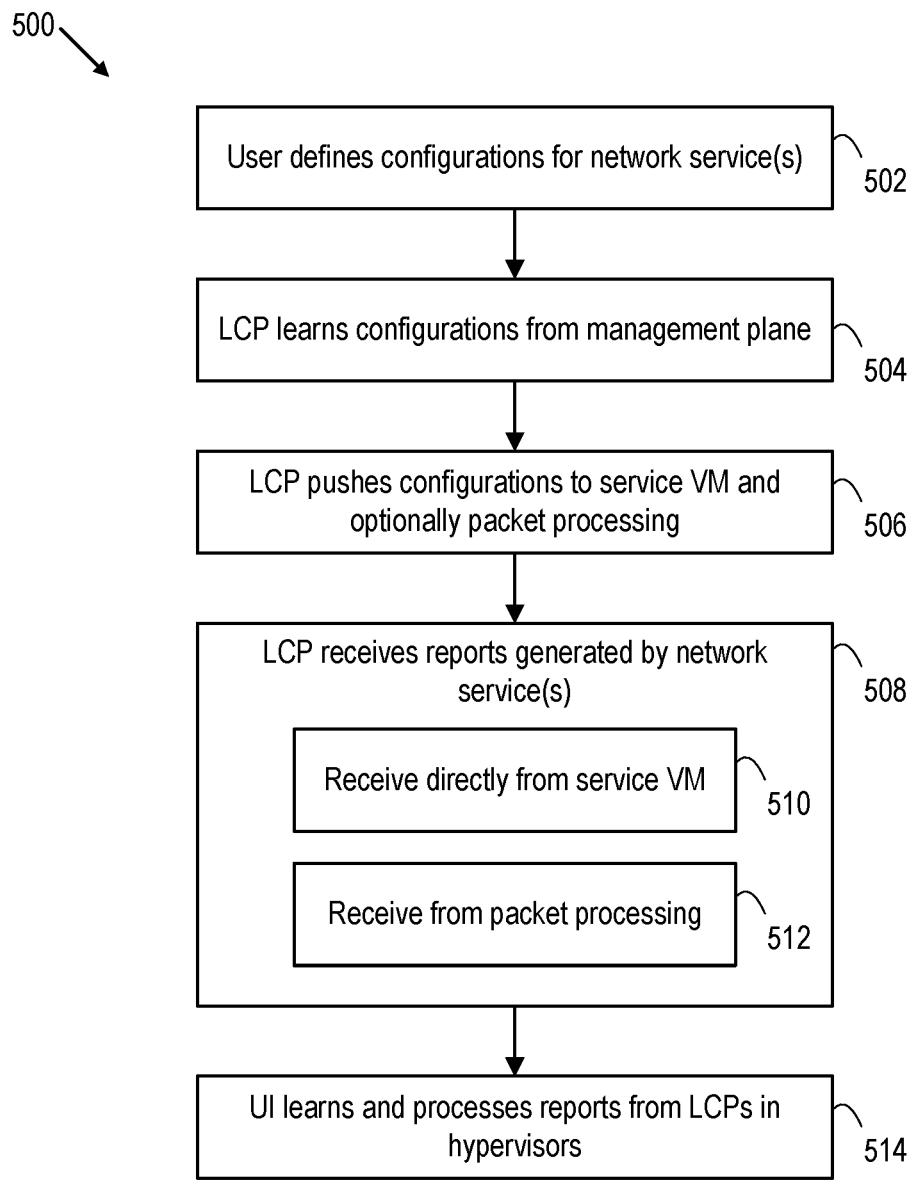
FIG. 5 is flow diagram depicting a method of configuring network services in the host cluster according to embodiments.

FIG. 5 is flow diagram depicting a method 500 of configuring network services in the host cluster according to embodiments. Method 500 begins at step 502, where a user defines configurations for the network services. At step 504, LCP 214 learns the configurations from a management plane (e.g., network manager 112). For example, network manager 112 can push the configurations to LCP 214 or LCP 214 can pull the configurations from network manager 112. At 506, LCP 214 pushes configurations to service VM 136S and optionally to packet processing 212 to configure the network services. At step 508, LCP 214 receives reports generated by the network services that indicate status. At step 510, LCP 214 can receive the reports directly from service VM 136S. At step 512, LCP 214 can receive reports from packet processing 212. Reports from packet processing 212 can be generated by network services 213 thereof or from network services 230 in service VM 136S. In such case, network services 230 can embed status information in the packets being returned from service VM 136S to packet processing 212. Packet processing 212 can parse out this status information and provide to LCP 214. At step 514, UI 121 learns and processes reports from LCPs 214 in the host cluster. UI 121 can display status information to the user, generate alarms, and the like in response to the reports.

Figure 6:
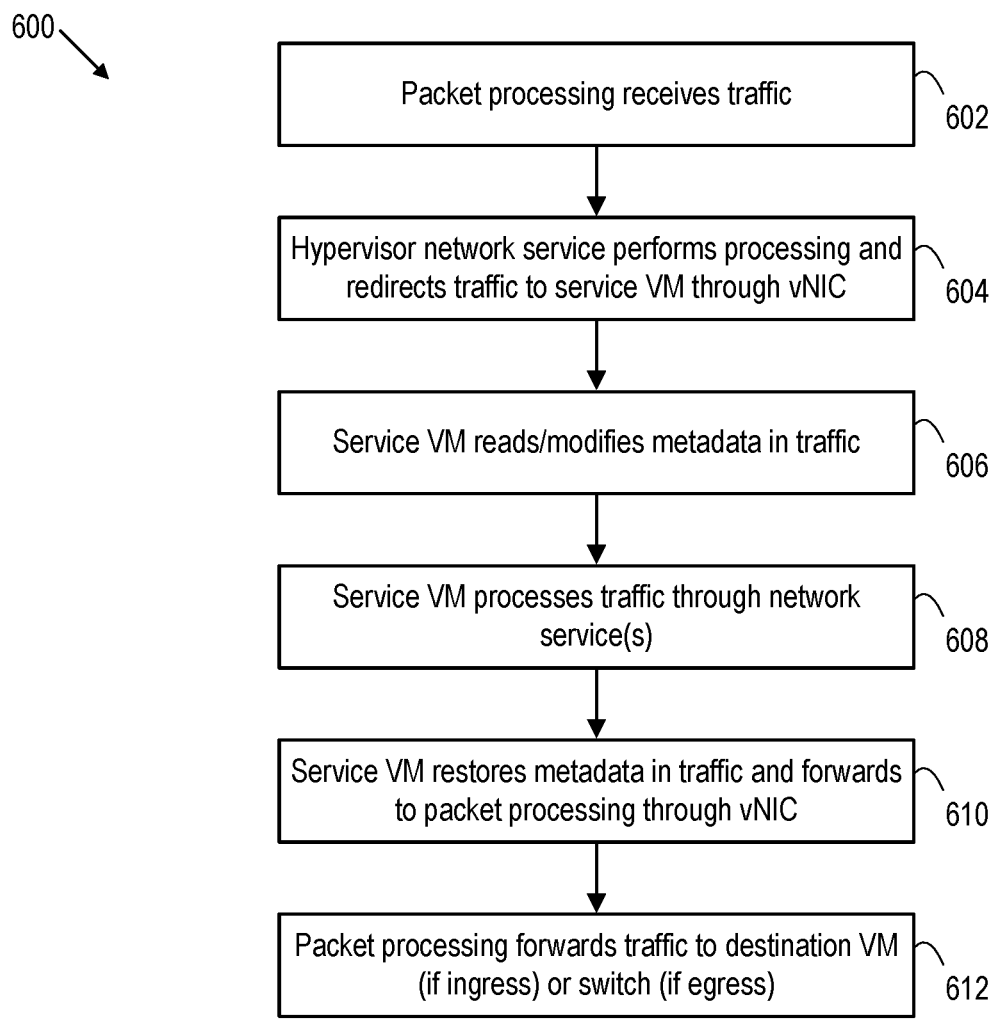
FIG. 6 is a flow diagram depicting a method of packet processing in a host cluster according to embodiments.

FIG. 6 is a flow diagram depicting a method of packet processing in a host cluster according to embodiments. Method 600 begins at step 602, where packet processing 212 of a hypervisor receives traffic. The traffic can be egress traffic from a source VM or ingress traffic to a destination VM. At step 604, a network service 213 of packet processing 212 (hypervisor network service) performs processing on packets of the traffic and redirects the traffic to a service VM through a vNIC of the service VM. In embodiments, service VM 136S is in the same host managed by the hypervisor. In other embodiments, service VM 136S can execute in another host of the cluster. In such case, packet processing 213 forwards the traffic to the other host for processing by service VM 136S.

At step 606, service VM 136S reads and/or modifies metadata in the traffic for processing by network services 230. At step 608, service VM 136S process the traffic through network services 230. Depending on the metadata in the traffic, service VM 136S can steer the traffic to specific network services 230 or chain the traffic through a specific sequence of the network services 230. At step 610, service VM 136S can restore any modified metadata in the traffic for return to packet processing 212. Service VM 136S forwards the traffic to packet processing 212 through its vNIC. At step 612, packet processing 212 forwards the traffic to the destination VM in case of ingress traffic or hypervisor switch in case of egress traffic.

A device or an apparatus may perform these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The technology described herein may be practiced with other computer system configurations including hand-held devices, microprocessor systems, microprocessor-based or programmable consumer electronics, minicomputers, mainframe computers, etc.

Methods described above may be implemented using one or more computer programs or one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

It should be understood that certain changes may be made to the methods or systems described hereinabove without departing from the scope of the claims. Accordingly, the described technology is to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of packet processing in a host cluster of a virtualized computing system, comprising:
   receiving traffic at packet processing software of a hypervisor executing on a host of the host cluster;
   processing the traffic using a network service of the packet processing software in the hypervisor;
   redirecting the traffic to a service virtual machine (VM) in the host cluster through a virtual network interface card (vNIC) of the service VM, the packet processing software modifying packet headers in the traffic to set a destination of the vNIC;

sending metadata from the network service of the packet processing software to the service VM;

processing the traffic and the metadata through network services executing in the service VM, the service VM steering the traffic through the network services in a sequence based on the metadata;

returning the traffic from the service VM to the packet processing software of the hypervisor; and forwarding, by the packet processing software, the traffic to a destination.

2. The method of claim 1, wherein the service VM is supported by the hypervisor in the host.

3. The method of claim 1, wherein the hypervisor includes an infravisor, the infravisor configured to deploy the service VM based on a desired state defined by a lifecycle manager (LCM) executing in the virtualized computing system.

4. The method of claim 2, wherein the infravisor is configured to monitor the service VM over a software communication channel between the hypervisor and the service VM.

5. The method of claim 1, wherein the hypervisor includes a local control plane (LCP), the LCP configured to receive network service configurations from a management plane, the LCP configured to provide the network service configurations to the at least one network service executing in the service VM over a software communication channel between the hypervisor and the service VM.

6. The method of claim 1, wherein the traffic comprises egress traffic from a VM supported by the hypervisor and the destination comprises a switch of the hypervisor.

7. The method of claim 1, wherein the traffic comprises ingress traffic received from a switch of the hypervisor and the destination comprises a VM supported by the hypervisor.

8. A non-transitory computer readable medium comprising instructions to be executed in a computing device to cause the computing device to carry out a method of packet processing in a host cluster of a virtualized computing system, comprising:

receiving traffic at packet processing software of a hypervisor executing on a host of the host cluster;

processing the traffic using a network service of the packet processing software in the hypervisor;

redirecting the traffic to a service virtual machine (VM) in the host cluster through a virtual network interface card (vNIC) of the service VM, the packet processing software modifying packet headers in the traffic to set a destination of the vNIC;

sending metadata from the network service of the packet processing software to the service VM;

processing the traffic and the metadata through network services executing in the service VM, the service VM steering the traffic through the network services in a sequence based on the metadata;

returning the traffic from the service VM to the packet processing software of the hypervisor; and forwarding, by the packet processing software, the traffic to a destination.

9. The non-transitory computer readable medium of claim 8, wherein the service VM is supported by the hypervisor in the host.

10. The non-transitory computer readable medium of claim 8, wherein the hypervisor includes an infravisor, the infravisor configured to deploy the service VM based on a desired state defined by a lifecycle manager (LCM) executing in the virtualized computing system.

11. The non-transitory computer readable medium of claim 10, wherein the infravisor is configured to monitor the service VM over a software communication channel between the hypervisor and the service VM.

12. The non-transitory computer readable medium of claim 8, wherein the hypervisor includes a local control plane (LCP), the LCP configured to receive network service configurations from a management plane, the LCP configured to provide the network service configurations to the at least one network service executing in the service VM over a software communication channel between the hypervisor and the service VM.

13. The non-transitory computer readable medium of claim 8, wherein the traffic comprises egress traffic from a VM supported by the hypervisor and the destination comprises a switch of the hypervisor.

14. The non-transitory computer readable medium of claim 8, wherein the traffic comprises ingress traffic received from a switch of the hypervisor and the destination comprises a VM supported by the hypervisor.

15. A virtualized computing system, comprising:

a hardware platform including a central processing unit (CPU) and a memory;

a hypervisor configured to execute on the hardware platform;

a service virtual machine (VM) configured to execute on the hardware platform and supported by the hypervisor and including at least one network service executing therein;

packing processing software of the hypervisor configured to execute on the hardware platform and receive traffic, process the traffic using a network service thereof in the hypervisor, redirect the traffic to the service VM through a virtual network interface card (vNIC) of the service VM, and send metadata to the service VM, the packet processing software configured to modify packet headers in the traffic to set a destination of the vNIC;

the service VM configured to process the traffic and the metadata through the network services executing therein and return the traffic to the packet processing software of the hypervisor, the service VM configured to steer the traffic through the network services in a sequence based on the metadata; and the packet processing software configured to forward the traffic to a destination.

16. The virtualized computing system of claim 15, wherein the hypervisor includes an infravisor, the infravisor configured to deploy the service VM based on a desired state defined by a lifecycle manager (LCM) executing in the virtualized computing system.

17. The virtualized computing system of claim 16, wherein the infravisor is configured to monitor the service VM over a software communication channel between the hypervisor and the service VM.

18. The virtualized computing system of claim 15, wherein the hypervisor includes a local control plane (LCP), the LCP configured to receive network service configurations from a management plane, the LCP configured to provide the network service configurations to the at least one network service executing in the service VM over a software communication channel between the hypervisor and the service VM.

19. The virtualized computing system of claim 15, wherein the traffic comprises egress traffic from a VM supported by the hypervisor and the destination comprises a switch of the hypervisor.

20. The virtualized computing system of claim 15, wherein the traffic comprises ingress traffic received from a switch of the hypervisor and the destination comprises a VM supported by the hypervisor.

\* \* \* \* \*